US010162520B2

(12) United States Patent
Adams

(10) Patent No.: US 10,162,520 B2
(45) Date of Patent: *Dec. 25, 2018

(54) FREE FORM USER-DESIGNED SINGLE-HANDED TOUCHSCREEN KEYBOARD

(71) Applicant: International Business Machines Corporation, Armonk, NY (US)

(72) Inventor: Tina M. Adams, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 314 days.

This patent is subject to a terminal disclaimer.

(21) Appl. No.: 14/718,439

(22) Filed: May 21, 2015

(65) Prior Publication Data

US 2016/0062644 A1    Mar. 3, 2016

Related U.S. Application Data

(63) Continuation of application No. 14/469,128, filed on Aug. 26, 2014.

(51) Int. Cl.
G06F 3/0488 (2013.01)
G06F 3/0482 (2013.01)
G06F 1/16 (2006.01)

(52) U.S. Cl.
CPC ........ *G06F 3/04886* (2013.01); *G06F 1/1626* (2013.01)

(58) Field of Classification Search
CPC .......................... G06F 3/04886; G06F 3/0482
See application file for complete search history.

(56) References Cited

U.S. PATENT DOCUMENTS 6,611,253 B1    8/2003  Cohen
2010/0241985 A1  9/2010  Kim et al.
(Continued)

OTHER PUBLICATIONS

United States Patent and Trademark Office, Office Action for U.S. Appl. No. 14/469,128, dated Aug. 11, 2016, pp. 1-45, Alexandria, VA, USA.

(Continued)

*Primary Examiner* — Kevin L Young
*Assistant Examiner* — Parmanand D Patel
(74) *Attorney, Agent, or Firm* — Lee Law, PLLC; Christopher B. Lee

(57) ABSTRACT

A user thumb-operated touchscreen keyboard design interface is provided by a processor on a touchscreen display of a handheld device that allows a user to create a user-designed thumb-operated touchscreen keyboard. A set of user inputs to the user thumb-operated touchscreen keyboard design interface is detected in response to user thumb gestures on the touchscreen display. The set of user inputs include a user-specified outline on the touchscreen display of the user-designed thumb-operated touchscreen keyboard with boundaries within a range of motion of a thumb of the user, a group of different user-specified touchscreen input key locations and input key shapes of a group of user-specified touchscreen input keys within the user-specified outline, and user-specified touchscreen input key processor-input function assignments of the group of user-specified touchscreen input keys. The user-designed thumb-operated touchscreen keyboard is implemented as a touchscreen display user input interface to the processor.

8 Claims, 8 Drawing Sheets

(56) References Cited

U.S. PATENT DOCUMENTS

| | | | |
|---|---|---|---|
| 2012/0075194 A1 | 3/2012 | Ferren | |
| 2012/0162078 A1* | 6/2012 | Ferren | G06F 3/04886 345/168 |
| 2013/0176228 A1* | 7/2013 | Griffin | G06F 17/276 345/168 |
| 2013/0234949 A1* | 9/2013 | Chornenky | G06F 3/0216 345/169 |
| 2013/0263039 A1* | 10/2013 | Fahlgren | G06F 3/0489 715/780 |
| 2014/0040810 A1* | 2/2014 | Haliburton | G06F 3/017 715/773 |
| 2014/0098036 A1* | 4/2014 | Paek | G06F 3/023 345/173 |
| 2014/0289642 A1* | 9/2014 | Prasad | G06F 3/048 715/745 |
| 2015/0026624 A1* | 1/2015 | Hui | G06F 3/0216 715/773 |
| 2016/0062632 A1 | 3/2016 | Adams | |

OTHER PUBLICATIONS

IBM, List of IBM Patents or Patent Applications Treated as Related, Applicant Appendix, Jun. 16, 2015, pp. 1-2, the contents of which are incorporated herein by reference in their entirety.

Joe Fedewa, Microsoft testing curved, one-hand use virtual keyboard for WP8?, Website/page, Jul. 2, 2012, pp. 1-2, Winsource.com, Published online at: http://winsource.com/2012/07/02/microsoft-testing-curved-one-hand-use-virtual-keyboard-for-wp8/.

United States Patent and Trademark Office, Office Action for U.S. Appl. No. 14/469,128, dated Feb. 24, 2017, pp. 1-39, Alexandria, VA, USA.

United States Patent and Trademark Office, Office Action for U.S. Appl. No. 14/469,128, dated Jan. 11, 2018, pp. 1-84, Alexandria, VA, USA.

\* cited by examiner

FREE FORM USER-DESIGNED SINGLE-HANDED TOUCHSCREEN KEYBOARD

BACKGROUND

The present invention relates to touchscreen keyboards. More particularly, the present invention relates to a free form user-designed single-handed touchscreen keyboard.

Handheld touchscreen devices, such as cellular telephones, smartphones, and tablet computing devices, utilize fixed key-location button-press style keyboards or fixed key-location keyboards rendered on touchscreen displays. Users utilize the respective fixed key-location keyboards to type input into the respective handheld touchscreen devices. The handheld touchscreen devices capture the typed user input to form messages, calendar entries, or other forms of user input.

BRIEF SUMMARY

A method includes providing, by a processor on a touchscreen display of a handheld device, a user thumb-operated touchscreen keyboard design interface that allows a user to create a user-designed thumb-operated touchscreen keyboard; detecting, via the user thumb-operated touchscreen keyboard design interface in response to user thumb gestures on the touchscreen display, a set of user inputs comprising: a user-specified outline on the touchscreen display of the user-designed thumb-operated touchscreen keyboard with boundaries within a range of motion of a thumb of the user on the touchscreen display, a plurality of different user-specified touchscreen input key locations and input key shapes of a plurality of user-specified touchscreen input keys within the user-specified outline of the user-designed thumb-operated touchscreen keyboard, and user-specified touchscreen input key processor-input function assignments of the plurality of user-specified touchscreen input keys; and implementing the user-designed thumb-operated touchscreen keyboard as a touchscreen display user input interface to the processor.

A system includes a touchscreen display of a handheld device; and a processor programmed to: provide, on the touchscreen display of the handheld device, a user thumb-operated touchscreen keyboard design interface that allows a user to create a user-designed thumb-operated touchscreen keyboard; detect, via the user thumb-operated touchscreen keyboard design interface in response to user thumb gestures on the touchscreen display, a set of user inputs comprising: a user-specified outline on the touchscreen display of the user-designed thumb-operated touchscreen keyboard with boundaries within a range of motion of a thumb of the user on the touchscreen display, a plurality of different user-specified touchscreen input key locations and input key shapes of a plurality of user-specified touchscreen input keys within the user-specified outline of the user-designed thumb-operated touchscreen keyboard, and user-specified touchscreen input key processor-input function assignments of the plurality of user-specified touchscreen input keys; and implement the user-designed thumb-operated touchscreen keyboard as a touchscreen display user input interface to the processor.

A computer program product includes a computer readable storage medium having computer readable program code embodied therewith, where the computer readable program code when executed on a computer causes the computer to: provide, on a touchscreen display of a handheld device, a user thumb-operated touchscreen keyboard design interface that allows a user to create a user-designed thumb-operated touchscreen keyboard; detect, via the user thumb-operated touchscreen keyboard design interface in response to user thumb gestures on the touchscreen display, a set of user inputs comprising: a user-specified outline on the touchscreen display of the user-designed thumb-operated touchscreen keyboard with boundaries within a range of motion of a thumb of the user on the touchscreen display, a plurality of different user-specified touchscreen input key locations and input key shapes of a plurality of user-specified touchscreen input keys within the user-specified outline of the user-designed thumb-operated touchscreen keyboard, and user-specified touchscreen input key computer-input function assignments of the plurality of user-specified touchscreen input keys; and implement the user-designed thumb-operated touchscreen keyboard as a touchscreen display user input interface to the computer.

DETAILED DESCRIPTION

Figure 1:
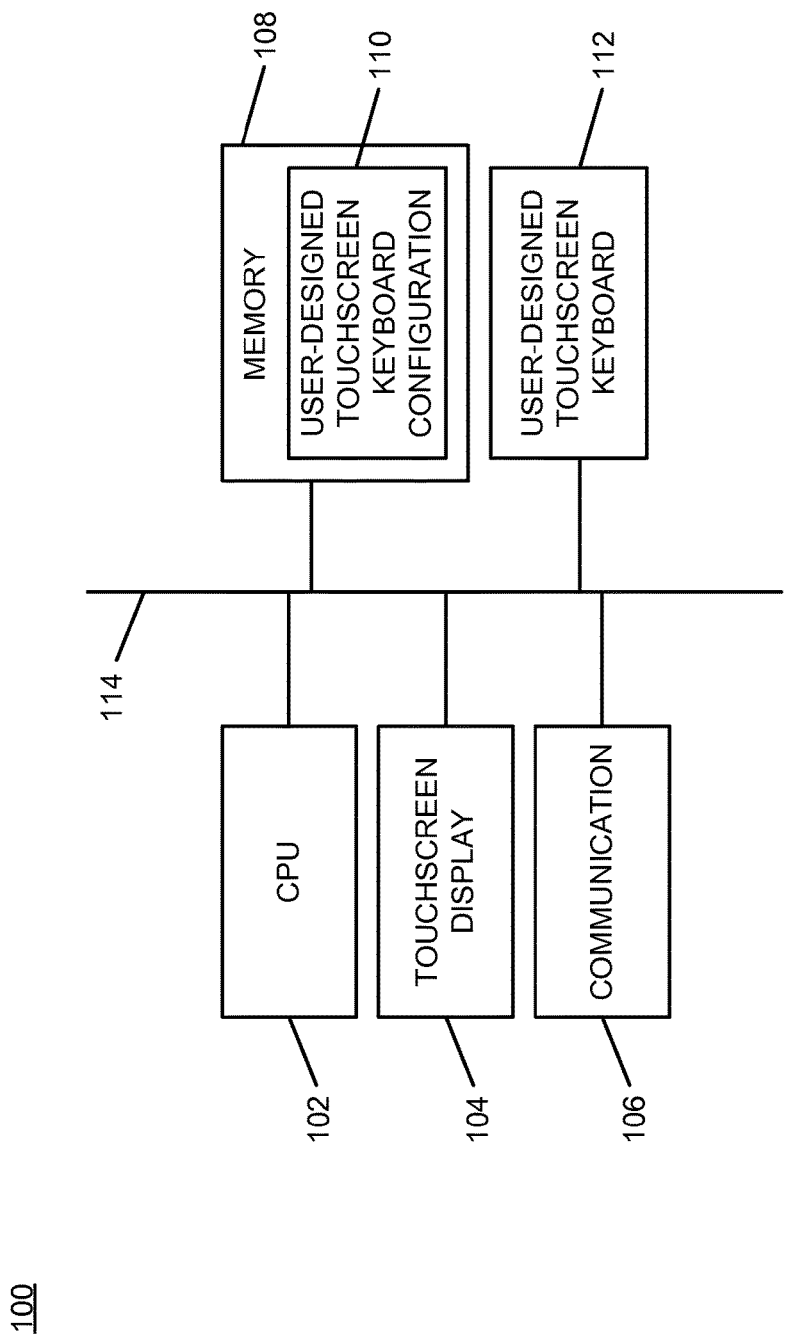
FIG. 1 is a block diagram of an example of an implementation of a core processing module capable of providing a free form user-designed single-handed touchscreen keyboard according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides a free form user-designed single-handed touchscreen keyboard. A user thumb-operated touchscreen keyboard design interface is provided on a touchscreen display by a processor. The user thumb-operated touchscreen keyboard design interface allows a user to create a user-designed thumb-operated touchscreen keyboard. A set of user inputs are detected using the user thumb-operated touchscreen keyboard design interface in response to user thumb gestures on the touchscreen display that include a user-specified outline on the touchscreen display of the user-designed thumb-operated touchscreen keyboard with boundaries within a range of motion of a thumb of the user on the touchscreen display. Multiple different user-specified touchscreen input key locations and input key shapes of multiple user-specified touchscreen input keys are detected within the user-specified outline of the user-designed thumb-operated touchscreen keyboard, and user-specified touchscreen input key processor-input function assignments of the user-specified touchscreen input keys are detected. The user-designed thumb-operated touchscreen keyboard is implemented as a touchscreen display user input interface to the processor.

As such, the present technology allows a user to completely design not only the actual shape of the keyboard itself, but also allows the user to completely design the shapes and locations of each individual input element, and the functionality assigned to each input element. The functionality assigned to individual input elements may be specified by the user to be words and/or complete phrases/sentences, in addition to specific letters and numerals. As such, a user may create a touchscreen keyboard with specific words or phrases of interest in combination with letters of an alphabet and numerals. Users may further assign categories to individual input elements and associate sets of phrases that are user selectable. In response to actuation by touching a category key with the thumb, a pop-up dialog box of categorized input phrases/sentences may be presented to the user and the user may drag the thumb down through the pop-up dialog box to select one of the categorized input phrases/sentences. The user may further assign a category image to the category input elements to allow category selection by image rather than text key assignment. As such, the present technology provides a truly individualized touchscreen keyboard that includes features specified by the respective individual user(s) and that is ergonomically tailored to the specific user's needs and/or interests.

The customizable configuration allows the user to position their defined keys optimally based upon their unique dexterity, as well as optimally for either thumb pad target and/or thumb tip target. The user may design the entire keyboard layout, key-by-key, to meet their specific interests. The user may choose settings, choose a blank key to map, and define the key itself.

To define the keyboard shape, the user may enter a keyboard boundary configuration mode where the user may use "thumb drawing" on the surface of the touchscreen display to drag the user's thumb around a desired perimeter of the user-designed keyboard. The outline may then be presented to the user for confirmation of the outlined user-designed keyboard shape. The user may confirm the shape or may drag individual edges/arcs of the perimeter to form an updated boundary for the user-designed keyboard. As such, the user may refine the shape of the boundary/perimeter of the user-designed keyboard and may finalize the user-designed shape when the user has arrived at a preferred boundary/perimeter of the user-designed keyboard.

The free form user-designed single-handed touchscreen keyboard described herein may be considered a "virtual" input device because it is displayed on a touchscreen display and user touchpoints on the display surface of the touchscreen keyboard may be detected. Input function or content assignments associated with a touchscreen input key at the location of the detected touchpoints may be input and processed by a processor, such as a central processing unit (CPU). As such, the term "virtual" as used herein represents a displayed touchscreen element of a free form user-designed single-handed touchscreen keyboard.

The user design of the preferred boundary/perimeter of the user-designed keyboard is considered a "free form" virtual touchscreen keyboard that is designed by the user using as little as a single user hand and/or thumb actuation. The "free form" virtual touchscreen keyboard is designed to be used by the user with a single user hand and/or thumb actuation of all actions, including further design and use of the free form user-designed single-handed touchscreen keyboard.

To assign virtual input keys to the user-designed keyboard, the user presses on a location of the virtual user-designed keyboard and processing for key category/section assignments may be invoked for the user. The user may be guided through a series of steps to select locations and shapes of categories or sections of virtual input keys, including additional specifications by additional thumb drawing actions on the touchscreen display screen of a general area of the free form user-designed single-handed touchscreen keyboard.

The categories of virtual input keys may include, among other things, an alphabetical/numerical/attribute category, a word category, a phrase/sentence category, an equation category, and a keyboard control category. Other categories may be further configured by the user or provided to the user as part of a category setup/template feature.

As the user specifies by thumb drawing a key category location to begin key assignments, the user may be provided with a category selection dialog box that includes the configured categories as described above. The user may select an available category for assignment to the defined portion of the free form user-designed single-handed touchscreen keyboard. As categories are selected and assigned to defined areas, the selected categories are removed from the list of available categories for selection within the category selection box. This may assist the user with subsequent category assignments and avoid redundant category assignments to different portions of the user-designed keyboard. The processing to perform category assignment may be continued and iterate until all areas of the free form user-designed single-handed touchscreen keyboard have been defined by the user. As such, the user may define areas within the user-designed keyboard for different types of categories, such as those described above.

Once the user has completed category assignments, or as iterative processing during category assignments, the user may specify key assignments within the different category sections. As the user selects a location within a defined category area of the user-designed keyboard, the user may be presented with a pop-up dialog box for navigation to available input data element types for the respective category that is assigned to the area. For example, if the selected area is assigned as an alphabetical/numerical/attribute category, navigation to letters, numerals, or other characters may be provided to the user. The user may assign a particular letter, numeral, or other character to a key using a virtual "Assign" key presented to the user within the pop-up dialog box. As the user assigns a particular letter, numeral, or other character to the selected key, the assigned letter, numeral, or other character may be removed from the selection set to again assist the user with subsequent key assignments and to avoid redundant key assignments. This processing may be continued to assign additional keys to the particular category area.

Additionally, where the selected area is assigned as a word category or a phrase/sentence category, a word/phrase dialog may be displayed that again displays characters and additionally displays grammar symbols. The user may select a character and an additional pop-up dialog box with a word list of words that begin with the selected character may be displayed. The user may drag the thumb down to a word of interest and release to begin an assignment sequence to assign the selected word to the key. The user may again assign a particular word to a key using a virtual "Assign" key presented to the user within the pop-up dialog box. Again, this processing may be continued to assign additional keys to the particular category area.

If the user desires to create a phrase of multiple words, rather than assigning a selected word to a key, the user may select another character, and the additional pop-up dialog box with a word list of words that begin with the selected character may be displayed. Again, the user may drag the thumb down to a word of interest and release to begin an assignment sequence to assign the selected word to the key. Space characters may be automatically added between selected words to assist the user. When the particular phrase is completed, the user may select any grammar or punctuation that is preferred. For example, if the phrase is a statement, the user may select a period (e.g., ".") character or an exclamation point (e.g., "!"). Alternatively, where the phrase is a question, the user may select a question mark (e.g., "?"). The user may again assign a particular phrase to a key using a virtual "Assign" key presented to the user within the pop-up dialog box. Again, this processing may be continued to assign additional keys to the particular category area.

It should be noted that the user may assign multiple words or phrases to a single virtual key. This multiple word/phrase assignment may be considered a sub-category within the respective category. For example, the user may have a personal word/phrase sub-category, a business word/phrase sub-category, a hobby word/phrase sub-category, each with different words or phrases relevant to the particular activity and the persons with which the user interacts in association with the respective activities.

In such a situation of a sub-category of multiple words or phrases to a single virtual key, the assigned words or phrases may form a list of available words or phrases that are associated with and may be selected by use of the virtual key. When the user selects a virtual key with multiple word or phrase assignments, the user may be presented with a pop-up dialog that lists the assigned words/phrases, and the user may drag the user's thumb to the desired word/phrase, and may then release the thumb to select the desired word/phrase.

Additionally, where multiple words/phrases have been assigned to a particular key, an image/photograph may be assigned to the key as the image the user sees within the user-designed keyboard in association with the respective key. This use of images/photographs may further assist the user with recognition of the respective sub-category of words/phrases, and may be particularly beneficial for users with certain text character recognition issues.

Similar processing may be performed for the equation category where the user is a member of a scientific community and desires to communicate, for example, using mathematical symbolic notation. For example, equation category types (e.g., algebra, calculus, linear algebra, etc.) may be configured as part of an equation template to provide relevant symbols for user selection. Processing similar to that above may be performed to assign symbols in equation format to virtual keys.

The user may have different categories of phrases that are detailed and correlated with the different purposes of the different activities. For example, again where the user is a scientist, the user may design a touchscreen keyboard with an image of an atom assigned to a user-defined virtual key, and selection of that virtual key may provide a pop-up dialog with a set of equations or terminology that is specific to the user's work activities (e.g., "E=MC^2," "thermovoltaic action," etc.). Similarly, where the user has a pet, the user may design a touchscreen keyboard with an image of their pet assigned to a user-defined virtual key, and selection of that virtual key may provide a pop-up dialog with a set of phrases associated with their pet (e.g., "Remember to feed my iguana Petey!").

Similar processing may also be performed for the keyboard control category where the user may assign functionalities to keys. For example, a "SEND" function may be assigned to a virtual key that may be selected to send a message (e.g., a text message) and that has been configured using the user-designed touchscreen keyboard. Additionally or alternatively, a keyboard toggle virtual key may be configured to toggle to different user-defined keyboards. Processing similar to that above may be performed to assign functionality to virtual keys. It should be noted that each different user-designed touchscreen keyboard may be completely different in shape and functionality, as preferred by the particular user.

Attributes may be configured for any key, in a manner such as that described above for individual character key assignments. Attributes may be considered alternative key assignments, such as a pound symbol ("#"), an "at" symbol ("@"), and other symbols used by the particular user when creating messages. Attributes may be accessed for a given key using a prolonged press of the respective key.

Users may also share individually configured user-designed touchscreen keyboards. Subsequent users may modify shared user-designed touchscreen keyboards to further adapt the shared user-designed touchscreen keyboard to their particular interests and uses. Many possibilities for sharing and adaptation of user-designed touchscreen keyboards exist, and all such possibilities are considered within the scope of the present technology.

Once the user has completed all key assignments, the free form user-designed single-handed touchscreen keyboard may be used to improve the user's efficiency of small form-factor devices, such as cellular telephones and smartphones. As such, the free form user-designed single-handed touchscreen keyboard provides a very compact and efficient user interface for communications using small form-factor devices, such as cellular telephones and smartphones.

It should be noted that while the completely free form design of the user-defined keyboard may be performed as described above, users may also begin with a predefined downloadable keyboard template. The user may edit the downloaded predefined keyboard template to personalize the touchscreen keyboard. Personalization of the touchscreen keyboard may include any of the design aspects discussed above. Further the user may move boundaries of the touchscreen keyboard itself, move keys, remap keys to different input text, add new keys, or otherwise configure the user-designed keyboard.

The interface to the user-designed keyboard adjusts accordingly with a "drag and push" style of touchscreen keyboard design. The interface may be further configured with a grid tolerance to assist with proportionality and usability of the user-designed keyboard (e.g., a specified number for pixel tolerance snap).

For users with fewer word/phrase category needs, the user may combine work and non-work related categories on a single user-designed single-handed virtual touchscreen keyboard. Alternatively, where the user desires more virtual real estate on a display screen for the user-designed touchscreen keyboard, the user may further design different keyboards for different purposes, such as one free form user-designed single-handed touchscreen keyboard for use during work activities and a different free form user-designed single-handed touchscreen keyboard for use during personal times. The user may configure a toggle key to toggle between the different touchscreen keyboards. Use of partitioning of work and non-work activities into different touchscreen keyboards may further assist the user with higher productivity at work and more general satisfaction while away from work.

The user-designed touchscreen keyboard may also be flipped from side to side to accommodate left or right hand usage. The user-designed touchscreen keyboard may further be docked in any corner of a display.

The user may change contrast and color scheme to accommodate for color blindness or other visual issues. Users may further choose from a preset theme, may use the theme as a base for further editing, or may create a completely custom theme to adjust all aspects of the user-designed keyboard.

Users may further download button designs and button design templates with effects for certain activities (e.g., select, hover, focus, etc.). Key sounds may additionally be downloaded and configured for keys of the user-designed touchscreen keyboard.

The user may specify a keyboard size by adjusting their dexterity/mobility area settings and the keyboard will dynamically adjust to their personal swipe area and specific target areas. As such, on a particular day when a user has more mobility, the user may be capable of and prefer to further extend virtual keys. Alternatively, on a particular day when a user has less mobility, the user may prefer to decrease distances to virtual keys. The keyboard dimensions for any given usage period may be interpolated from detected touch points, and the keyboard area for individual user and usage period may be programmatically adjusted in real time to facilitate further ease of use of previously user-defined touchscreen keyboards.

It should be noted that conception of the present subject matter resulted from recognition of certain limitations associated with prior fixed key-location user interface keyboards for handheld touchscreen devices, such as smartphones, cellular telephones, and tablet computing devices. For example, it was observed that it is common for people to suffer injuries during a lifetime. It was determined from this observation that it was desirable to create a product that accommodates for individual differences in hand size, differences in dexterity, or difference in mobility of individual joints (e.g., joints of the user's thumb, such as with arthritis or other injury). It was further determined that users with certain physical limitations may be unable to effectively utilize fixed key-location keyboards. It was additionally observed that many fixed key-location keyboards provide an "auto-complete" feature that allows automated completion of partial text entries for users. However, it was determined that users with certain visual limitations, such as color blindness or dyslexia, may be unable to reasonably discern the accuracy of the word that is auto-completed, and that the auto-complete feature may result in such users forming and sending messages to others, such as text messages, that are considerably different from their intended message. It was determined from these observations and determinations that a highly-customizable individualized virtual user-designed keyboard was needed that would allow users to configure their own preferences for every aspect of keyboard boundaries, key sizes and shapes, key function and text assignments, and coloring contrasts. The present subject matter improves utility of any form of touchscreen device by providing a free form user-designed single-handed touchscreen keyboard, as described above and in more detail below. Touchscreen devices that may be improved by the present technology include smartphones, cellular telephones, and tablet computing devices, and further include any other computing device with a touchscreen display, whether handheld or mounted/located on a surface. As such, improved usability of touchscreen devices may be obtained through use of the present technology.

The user design and use of the free form user-designed single-handed touchscreen keyboard described herein may be performed in real time to allow prompt user design of keyboard shapes, key shapes, and key functionality, while providing accurate user selection of inputs based upon a user's individual physical circumstances. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a core processing module 100 capable of providing a free form user-designed single-handed touchscreen keyboard. The core processing module 100 may be associated with a touchscreen device, such as a cellular telephone, personal digital assistant (PDA), email device, music recording or playback device, tablet computing device, e-book reading device, or other small form-factor device, as appropriate for a given implementation. The core processing module 100 is described generally herein, though it is understood that many variations on implementation of the components within the core processing module 100 are possible and all such variations are within the scope of the present subject matter.

Further, the core processing module 100 may provide different and complementary processing for configuration and use of the free form user-designed single-handed touchscreen keyboard in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 102 ("processor") provides hardware that performs computer instruction execution, computation, and other capabilities within the core processing module 100. A touchscreen display 104 provides visual information to a user of the core processing module 100 and provides input capabilities for the user. The touchscreen display 104 may include display driver functionality for both display of user-designed touchscreen keyboards and other information, and may include user-touch detection functionality of any form of technology presently available or later developed.

A communication module 106 provides hardware, protocol stack processing, and interconnection capabilities that allow the core processing module 100 to communicate with other devices, such as with other computing devices. The communication module 106 may include any electrical, protocol, and protocol conversion capabilities useable to provide interconnection capabilities, appropriate for a given implementation.

A memory 108 includes a user-designed touchscreen keyboard configuration area 110 that stores templates and finalized user-designed touchscreen keyboards for the core processing module 100. It is understood that the memory 108 may include any combination of volatile and non-volatile memory suitable for the intended purpose, distributed or localized as appropriate, and may include other memory segments not illustrated within the present example for ease of illustration purposes. For example, the memory 108 may include a code storage area, an operating system storage area, a code execution area, and a data area without departure from the scope of the present subject matter.

A user-designed touchscreen keyboard module 112 is also illustrated. The user-designed touchscreen keyboard module 112 provides user configuration and control capabilities for touchscreen keyboards designed by users for the core processing module 100, as described above and in more detail below. The user-designed touchscreen keyboard module 112 implements the free form user-designed single-handed touchscreen keyboard of the core processing module 100.

It should also be noted that the user-designed touchscreen keyboard module 112 may form a portion of other circuitry described without departure from the scope of the present subject matter. Further, the user-designed touchscreen keyboard module 112 may alternatively be implemented as an application stored within the memory 108. In such an implementation, the user-designed touchscreen keyboard module 112 may include instructions executed by the CPU 102 for performing the functionality described herein. The CPU 102 may execute these instructions to provide the processing capabilities described above and in more detail below for the core processing module 100. The user-designed touchscreen keyboard module 112 may form a portion of an interrupt service routine (ISR), a portion of an operating system, a portion of a browser application, or a portion of a separate application without departure from the scope of the present subject matter.

The CPU 102, the touchscreen display 104, the communication module 106, the memory 108, and the user-designed touchscreen keyboard module 112 are interconnected via an interconnection 114. The interconnection 114 may include a system bus, a network, or any other interconnection capable of providing the respective components with suitable interconnection for the respective purpose.

Though the different modules illustrated within FIG. 1 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 100 is illustrated with and has certain components described, other modules and components may be associated with the core processing module 100 without departure from the scope of the present subject matter. Many other possible arrangements for components of the core processing module 100 are possible and all are considered within the scope of the present subject matter. Accordingly, the core processing module 100 may take many forms and may be associated with many small form-factor platforms.

Figure 2:
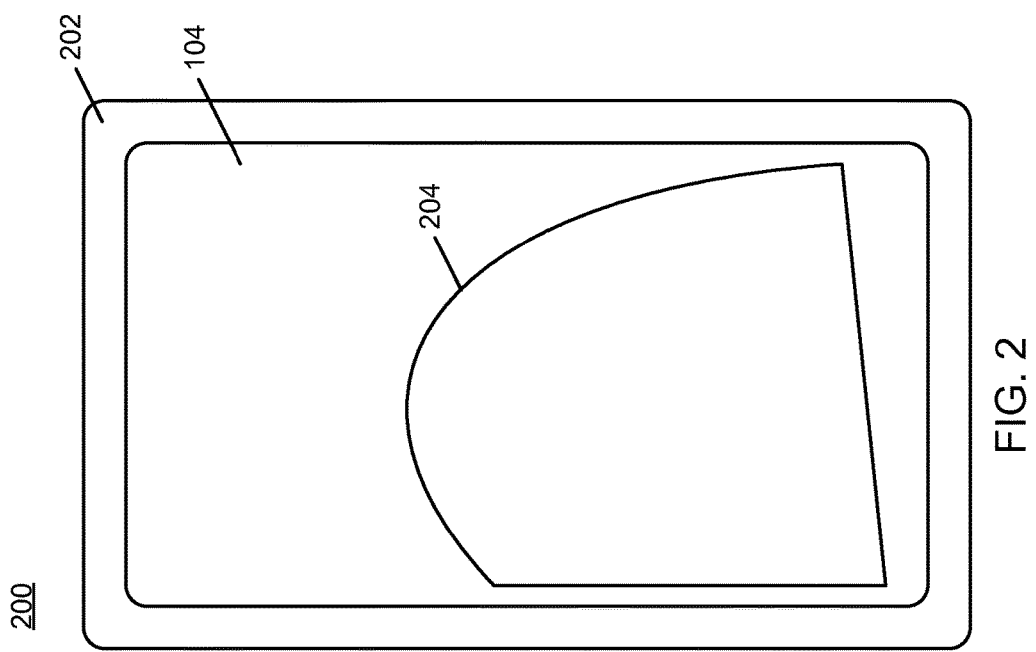
FIG. 2 is a diagram of an example of an implementation of a handheld device that utilizes the core processing module 100 for user design of a free form user-designed single-handed touchscreen keyboard according to an embodiment of the present subject matter.

FIG. 2 though FIG. 5 described below illustrate an example sequence of images that depict certain aspect of the processing described above for user design of a free form user-designed single-handed touchscreen keyboard. Many other variations on the example sequence of images and processing are possible and all are considered within the scope of the present subject matter.

FIG. 2 is a diagram of an example of an implementation of a handheld device 200 that utilizes the core processing module 100 for user design of a free form user-designed single-handed touchscreen keyboard. An enclosure 202 is shown to encapsulate the touchscreen display 104 described above. A user-designed virtual thumb keyboard 204 is illustrated in outline form as an initial phase of design of the user-designed virtual thumb keyboard 204. For purposes of the present example, to reduce drawing count, the outline of the user-designed virtual thumb keyboard 204 is presumed to be a finalized shape of a free form user-designed single-handed touchscreen keyboard, as designed by a user according to the user's own preferences, dexterity, and thumb reach/mobility. The user may thumb draw the outline of the user-designed virtual thumb keyboard 204 in one fluid motion of the thumb on the touchscreen display 104. Alternatively, the user may thumb draw edges and then thumb draw an arc to connect the edges. The user may further adjust dimensions of the outline of the user-designed virtual thumb keyboard 204 by "thumb pushing" edges, corners, or arcs of the outline of the user-designed virtual thumb keyboard 204 until a desired and comfortable range of boundaries of the user-designed virtual thumb keyboard 204 is obtained for the particular user. The user's "thumb-push" operations may be detected, and the shape of the user-drawn outline of the user-designed virtual thumb keyboard 204 may be adjusted in response to each thumb-push operation. The user may continue to utilize thumb-push operations until a finalized preferred shape of a user-designed virtual thumb keyboard 204 is achieved. The user may indicate that the shape is finalized by any appropriate touchscreen input, such as a double-tap of the thumb approximately in the middle of the displayed user-designed virtual thumb keyboard. The finalized user-designed virtual thumb keyboard 204 may be stored, such as within the user-designed touchscreen keyboard configuration area 110.

As described above, the user may "thumb draw" the outline of the user-designed virtual thumb keyboard 204 on the touchscreen display 104. Alternatively, the user may utilize a downloadable touchscreen keyboard template and may modify any dimension or angle of the template to arrive at the user's preferred shape of the finalized outline of the user-designed virtual thumb keyboard 204.

Figure 3:
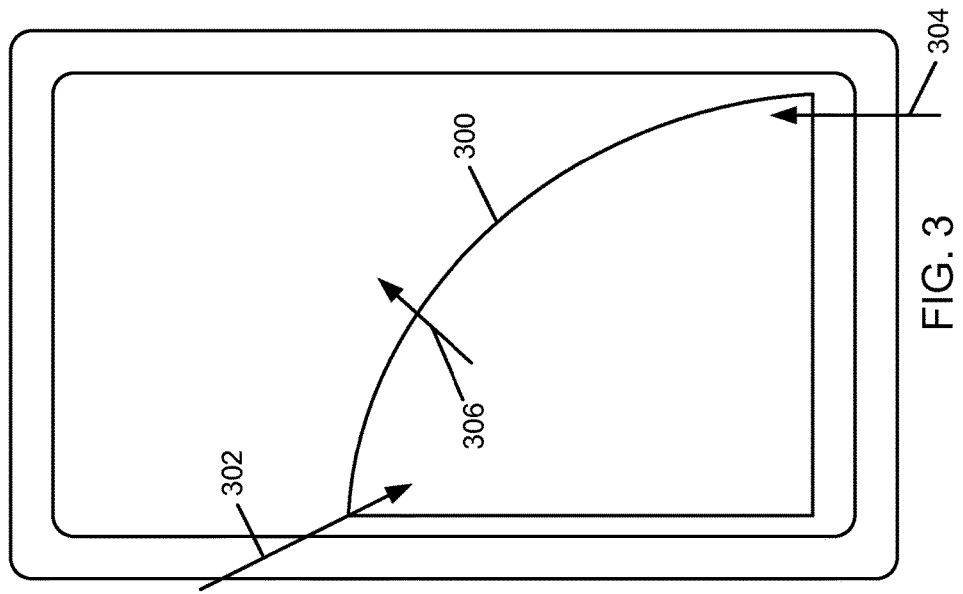
FIG. 3 is a diagram of an example of an implementation of a user-modifiable thumb-operated touchscreen keyboard template that may be downloaded by a user, and utilized as a starting point for configuration of a free form user-designed single-handed touchscreen keyboard according to an embodiment of the present subject matter.

FIG. 3 is a diagram of an example of an implementation of a user-modifiable thumb-operated touchscreen keyboard template 300 that may be downloaded by a user, and utilized as a starting point for configuration of a free form user-designed single-handed touchscreen keyboard. As can be seen from FIG. 3, the user-modifiable thumb-operated touchscreen keyboard template 300 is of a default shape of a quarter circle. An arrow 302, an arrow 304, and an arrow 306 represent example thumb-push operations that the user may perform to adjust the downloaded user-modifiable thumb-operated touchscreen keyboard template 300 to arrive at the user-specified outline of the user-designed virtual thumb keyboard 204 of FIG. 2. As can be seen from FIG. 3, the thumb-push operations represented by the arrow 302, the arrow 304, and the arrow 306 each cross a boundary along the perimeter of the user-modifiable thumb-operated touchscreen keyboard template 300. These boundary crossing thumb-push operations may be detected, and the shape of the user-modifiable thumb-operated touchscreen keyboard template 300 may be adjusted in response to each thumb-push operation. The user may continue to utilize thumb-push operations until a finalized preferred shape of a user-designed virtual thumb keyboard is achieved. The user may indicate that the shape is finalized by any appropriate touchscreen input, such as a double-tap of the thumb approximately in the middle of the displayed user-designed virtual thumb keyboard.

As such, the user may begin with a downloaded touchscreen keyboard template, such as the user-modifiable thumb-operated touchscreen keyboard template 300, and use thumb-push dimensions to arrive at the desired final shape of the user's preferred touchscreen keyboard, or may thumb draw the user's preferred touchscreen keyboard including any subtle adjustments by additional thumb push operations to arrive at the desired final shape of the user's preferred single-handed touchscreen keyboard. Though not illustrated within FIG. 3, the downloaded touchscreen keyboard template may include default touchscreen input keys in default locations with default key function assignments, and the user may fully adjust any default aspect associated with the downloaded touchscreen keyboard template. These default touchscreen input keys in default locations with default key function assignments are assumed to be a part of the user-modifiable thumb-operated touchscreen keyboard template 300 and are omitted from the drawing figure to allow a better representation of the arrow 302, the arrow 304, and the arrow 306. For purposes of the continuing example below, the user-designed virtual thumb keyboard 204 of FIG. 2 forms the basis for the description that follows.

Figure 4:
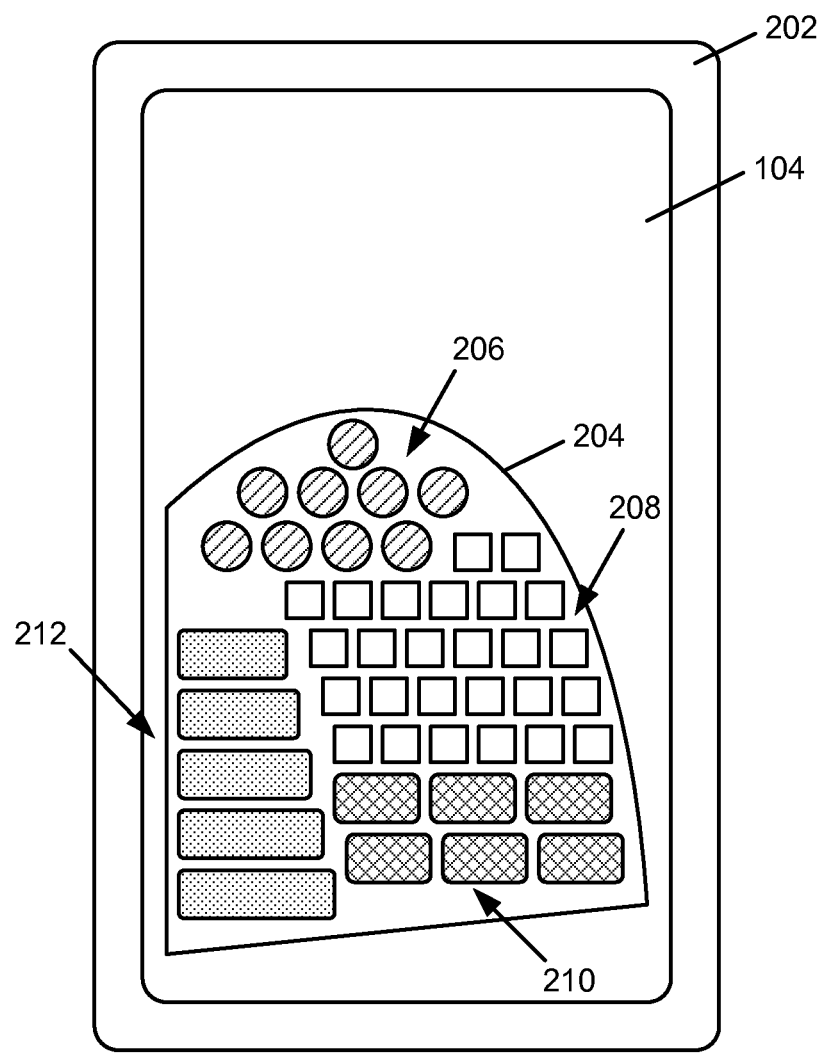
FIG. 4 is an illustration of an example of an implementation of the handheld device of FIG. 2 with different areas of the user-designed virtual thumb keyboard configured with different categories of virtual keys to further the example implementation of the free form user-designed single-handed touchscreen keyboard according to an embodiment of the present subject matter.

FIG. 4 is an illustration of an example of an implementation of the handheld device 200 of FIG. 2 with different areas of the user-designed virtual thumb keyboard 204 configured with different categories of virtual keys to further the example implementation of the free form user-designed single-handed touchscreen keyboard. As can be seen from FIG. 4, the user-designed virtual thumb keyboard 204 now includes four different categories of virtual input keys, as may be fully configured as specified by a user. The different categories of virtual input keys are compartmentalized into distinct areas of the user-designed virtual thumb keyboard 204. It is understood that any number of categories of virtual input keys may be implemented and configurable for the user-designed virtual thumb keyboard 204, and all such variations and possibilities are considered within the scope of the present subject matter.

A word category section 206 of the user-designed virtual thumb keyboard 204 is shown configured with circular virtual input keys (shown with angled hatching to further distinguish this category of virtual input keys). As described above, the user may assign individual words to virtual keys within the word category section 206 of the user-designed virtual thumb keyboard 204.

A letter and attribute category section 208 of the user-designed virtual thumb keyboard 204 is shown configured with square virtual input keys (shown with no hatching to further distinguish this category of virtual input keys). As described above, the user may assign individual letters and attributes (as a secondary key function with extended touch/press) to virtual keys within the letter and attribute category section 208 of the user-designed virtual thumb keyboard 204.

A sentence/phrase category section 210 of the user-designed virtual thumb keyboard 204 is shown configured with equal-sized rectangular virtual input keys (shown with cross hatching to further distinguish this category of virtual input keys). As described above, the user may assign full sentences and/or phrases to virtual keys within the sentence/phrase category section 210 of the user-designed virtual thumb keyboard 204.

A keyboard control category section 212 of the user-designed virtual thumb keyboard 204 is shown configured with unequal-sized rectangular virtual input keys (shown with dotted highlighting to further distinguish this category of virtual input keys). As described above, the user may assign control functionality (e.g., send, keyboard toggle, etc.) to virtual keys within the keyboard control category section 212 of the user-designed virtual thumb keyboard 204.

Figure 5:
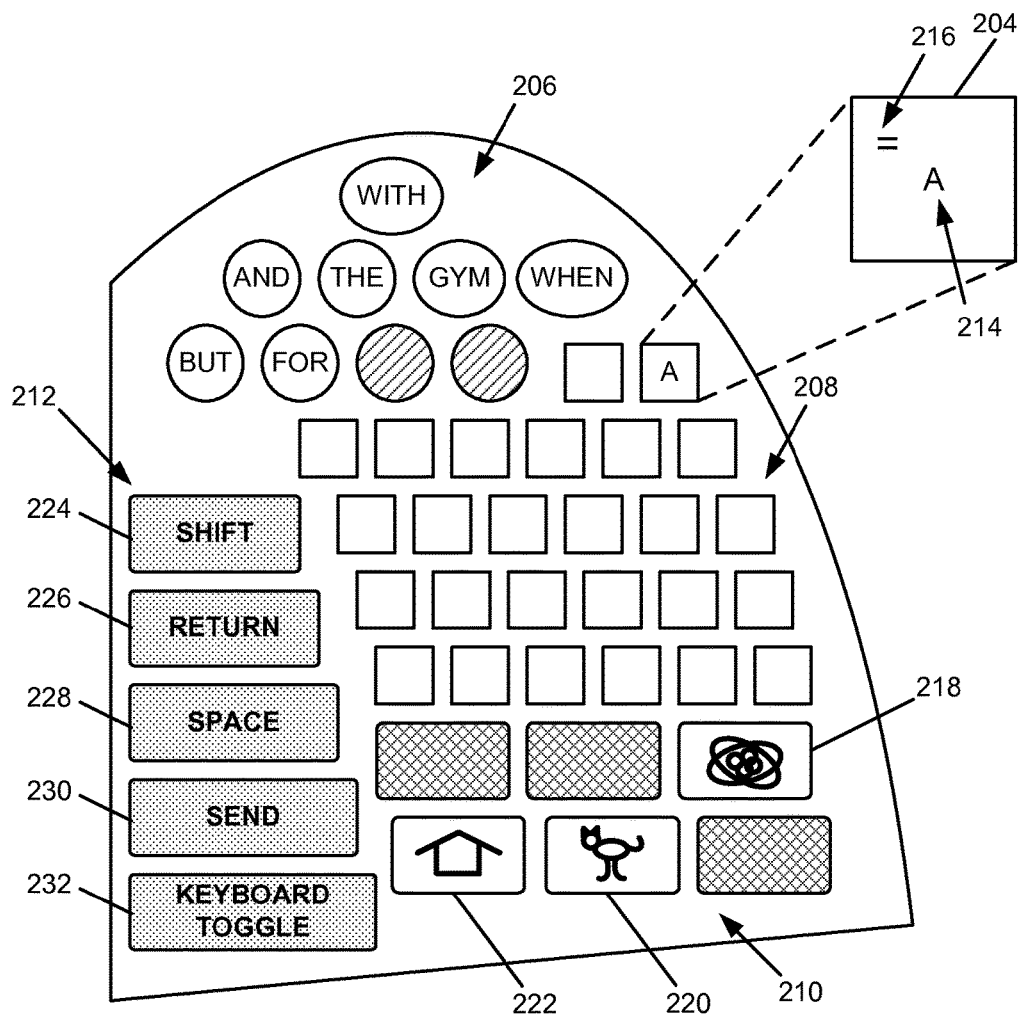
FIG. 5 is a close-up illustration of an example of an implementation of the user-designed virtual thumb keyboard configured with different categories of virtual keys to further the example implementation of the free form user-designed single-handed touchscreen keyboard according to an embodiment of the present subject matter.

FIG. 5 is a close-up illustration of an example of an implementation of the user-designed virtual thumb keyboard 204 configured with different categories of virtual keys to further the example implementation of the free form user-designed single-handed touchscreen keyboard. As can be seen from FIG. 5, the user-designed virtual thumb keyboard 204 is now shown to have several keys assigned with input functionality. The word category section 206 is shown to include virtual keys that include several words that have been specified by the user for ease of input, such as into text messages or documents. It should be noted that the user-designed virtual thumb keyboard 204 allows the user to stretch key shapes once initially designed and placed to allow for longer words (e.g, note that the "WITH" and "WHEN" keys are stretched relative to the "AND" key and the other three-letter word keys). Two input keys have yet to be specified by the user within the present example, thought the user-designed virtual thumb keyboard 204 may be considered fully functional for all specified inputs as soon as the respective inputs are assigned. It is understood that the user may specify the words to assign using an alternative standard touchscreen keyboard (not shown), by thumb drawing the letters on the touchscreen display 104, or otherwise as appropriate for the given implementation.

Regarding the letter and attribute category section 208, the present example shows that, within the letter and attribute category section 208, the user has specified, for one virtual input key, a virtual input key 214 to operate to input the letter "A" when the virtual input key 214 is detected to be actuated with a single press, and has specified for the same virtual input key, a virtual input key 216 to operate with an attribute equal sign character ("=") when the virtual input key 216 is detected to be actuated with an extended press. The dual-use single virtual input key 214/216 is shown in a break out enlarged to further illustrate an example letter and attribute location assignment, which may also be specified as appropriate by and for the respective user. It is understood that the user may fully specify the input character associated with each virtual input key in the letter and attribute category section 208. It is further understood that each virtual input key may have a letter and an attribute assigned in a manner similar to the dual-use single virtual input key 214/216. As described above, the user may be provided with a pop-up dialog of available characters to assign, and the selection set may be reduced by each selected/assigned character being removed from the selection set to help the user to expedite virtual keyboard design and to reduce redundancy. The additional virtual keys in the letter and attribute category section 208 may be assigned by the user, and further description of other virtual key assignments within the present example is omitted for brevity in the present description.

Further regarding text character input options and key assignments, the user may select from various keyboard configuration starting points to distribute virtual key assignments throughout the letter and attribute category section 208. Examples of possible initial virtual key assignments include key relationships such as QUERTY, AZERTY, Dvorak, Colemak, Alphanumeric, or full custom assignment as described above. These types of key assignment layouts are intended to facilitate different arrangements of input keys to assist with certain visual conditions that result in challenges regarding distinguishing certain input keys from one another. The respective selected starting point configuration of virtual key assignments may be fully modified and customized by the user to change input character assignment locations, and to add attributes as described above.

The sentence/phrase category section 210 is shown to also have several virtual keys defined as specified by the user. A virtual input key 218 is shown to be user designed and defined with an image of an atom, and for purposes of the present example represents that the user has associated certain scientific phrases and/or sentences or scientific equations with the virtual input key 218 that may each be accessed and selected as input from a pop-up dialog when the virtual input key 218 is pressed. Similarly, a virtual input key 220 and a virtual input key 222 are shown to be user designed and defined with an image of a cat and a house, respectively. For purposes of the present example, the virtual input key 220 represents that the user has associated certain phrases or sentences related to the user's pet with the virtual input key 220. Similarly, for purposes of the present example, the virtual input key 222 represents that the user has associated certain phrases or sentences related to the user's home with the virtual input key 222. Further description of an example pop-up phrase and sentence selection dialog is shown and described in association with FIG. 6 below.

The keyboard control category section 212 is shown to be user defined and designed to include certain touchscreen keyboard control functions, which for purposes of the present example include from top to bottom a "SHIFT" input key 224 that may be used to select assigned attributes for input, a "RETURN" input key 226 that may be used to select an enter or carriage return for input, a "SPACE" input key 228 that may be used to enter a space character as input, a "SEND" input key 230 that may be used to instruct the core processing module 100 to send a message (e.g., an email or text message), and a "KEYBOARD TOGGLE" input key 232 that may be used to toggle to another keyboard.

Further regarding the KEYBOARD TOGGLE" input key 232, this virtual key represents a user-defined input function to switch to an alternative user-defined keyboard. It should be noted that an alternative user-defined keyboard may have a completely different outline shape and set of virtual key categories, or may be based upon a user-designed keyboard as a template starting point with user modifications to arrive at the resulting assigned touchscreen keyboard. The user may further design and mix, for example, arrangements of keys that fan out or emanate from a point of origin near the user's thumb pivot location on the hand with linear arrays of virtual keys such as those shown in the example letter and attribute category section 208 of the user-designed virtual thumb keyboard 204. The user may further link more than two user-designed touchscreen keyboards of various shapes and functionalities to further expand the set of input options and touchscreen keyboard associations for the user, and may further link a conventional touchscreen keyboard (e.g., QUERTY, Dvorak, etc.) if the user desires to have such a keyboard available as a selectable keyboard option.

Figure 6:
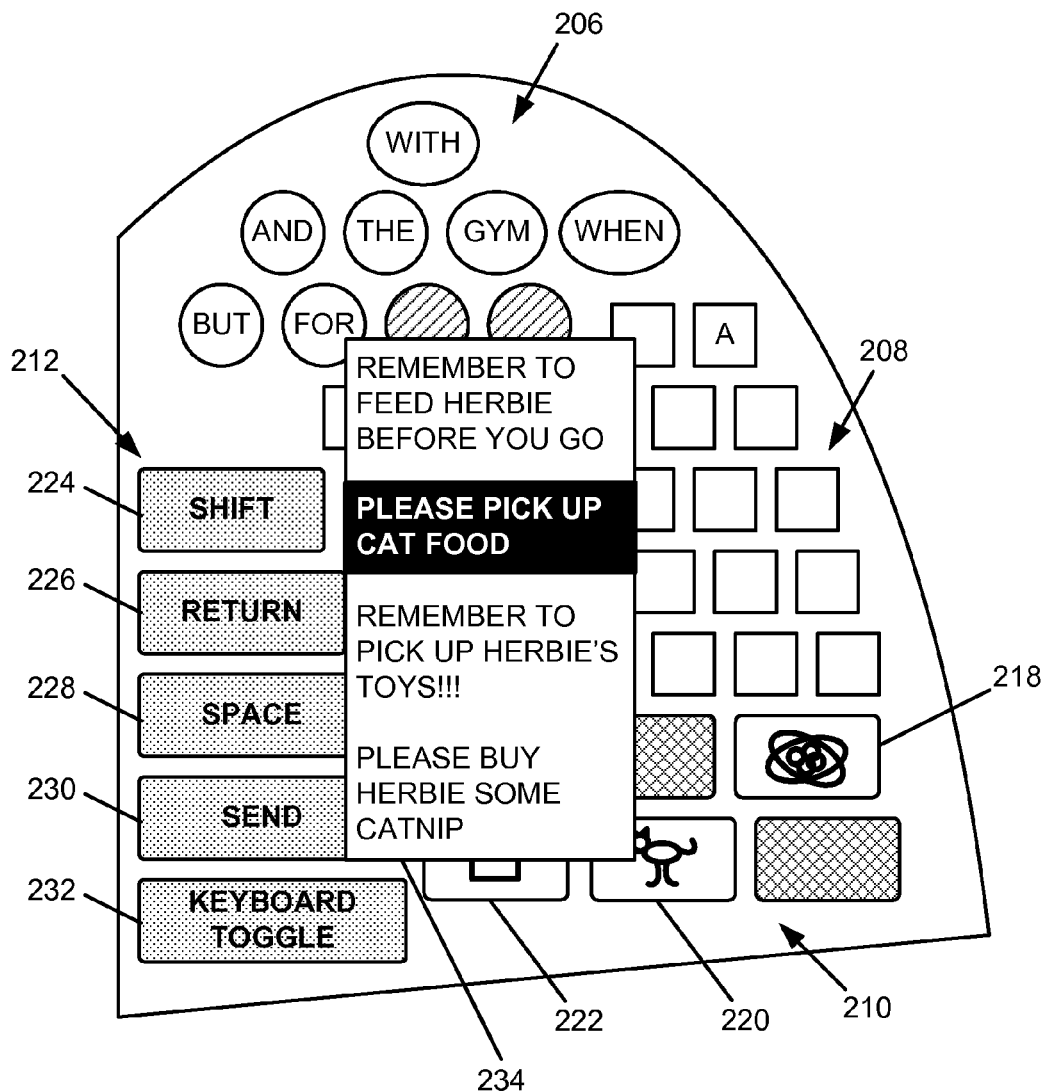
FIG. 6 is a close-up illustration of an example of an implementation of the user-designed virtual thumb keyboard of FIG. 5 with a pop-up dialog box that represents phrase and sentence assignments to the virtual input key with the image of the cat to categorize the phrases and sentences according to an embodiment of the present subject matter.

FIG. 6 is a close-up illustration of an example of an implementation of the user-designed virtual thumb keyboard 204 of FIG. 5 with a pop-up dialog box 234 that represents phrase and sentence assignments to the virtual input key 220 with the image of the cat to categorize the phrases and sentences. As can be seen from FIG. 6, the cat's name is "Herbie" for purposes of example. The user has specified four distinct phrases/sentences that may be selected responsive to an initial selection of the virtual input key 220 with the image of the cat. As described above, the initial selection of the virtual input key 220 may cause the pop-up dialog box 234 to be displayed to the user, and the user may select one of the listed phrases/sentences with a thumb slide and release action. As such, the user may rapidly form accurately entered phrases and sentences without typographical errors. Further, where phrases or sentences are communicated often, phrase and sentence assignments to virtual input keys as illustrated may automate the repetitive tasks of phrase and sentence entry. As can also be seen from FIG. 6, the phrase "Please pick up cat food" is shown in a reverse highlight. As such, for purposes of example, this phrase will be entered into a message (e.g., text message or email) input field (not shown).

The user may further utilize keys in combination to form complex messages with very few input key selections. For example, the "AND" key of the word category section 206 may be used in combination with phrase or sentence selections to concatenate phrases. As a further example, with three input selections, namely a selection of the virtual input key 220 with the image of the cat and a thumb release on the phrase "Please pick up cat food," followed by selection of the "AND" virtual key of the word category section 206, followed by a selection of the virtual input key 220 with the image of the cat and a thumb release on the phrase "Please buy Herbie some catnip," a complex multi-phrase request may be generated with minimal key selections. The phrase in the present example would result in an input message of "Please pick up cat food and Please buy Herbie some catnip."

In this manner, the free form user-designed single-handed touchscreen keyboard described herein may improve user efficiency in a user-determined manner. The free form user-designed single-handed touchscreen keyboard may be user-customized for virtually any virtual key assignments that a user may specify.

Figure 7:
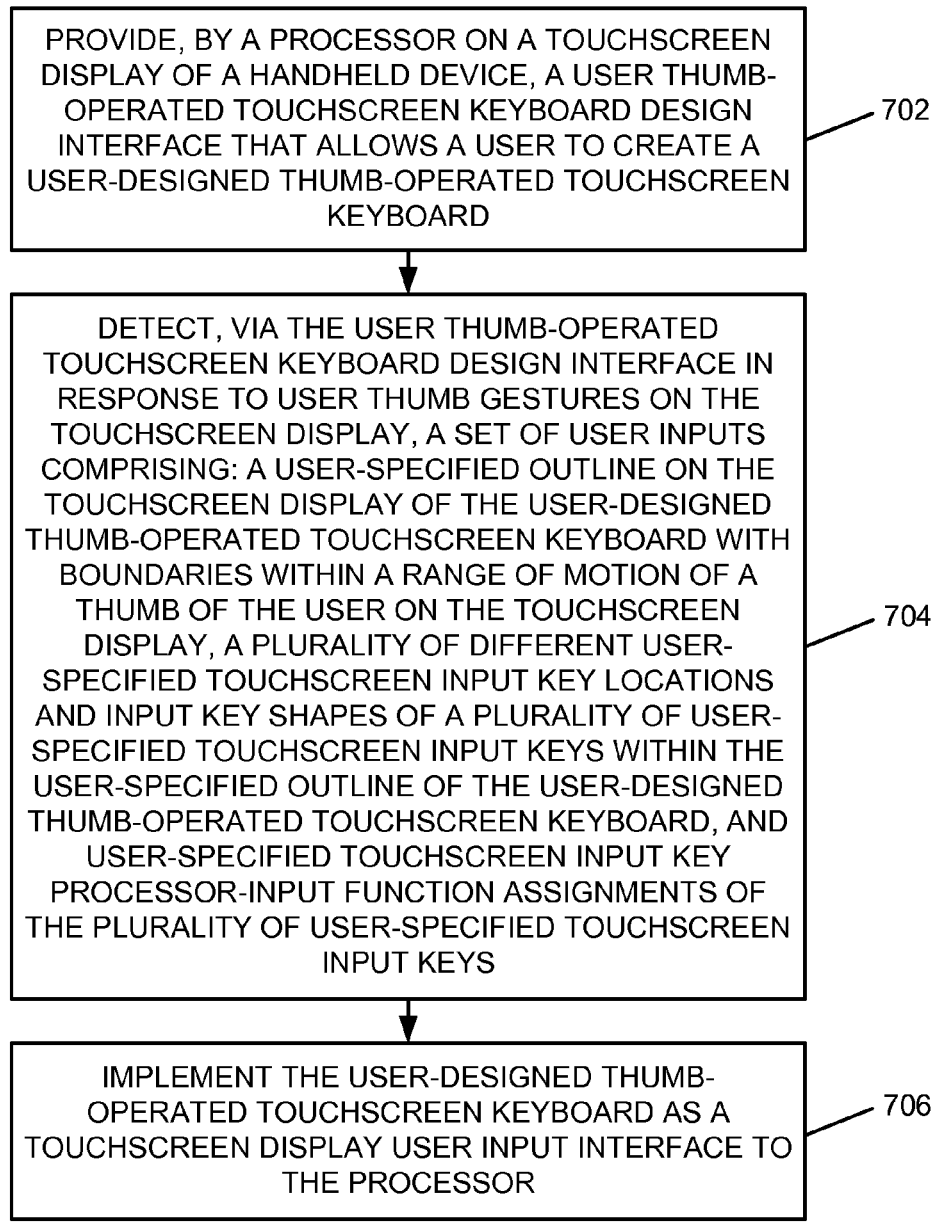
FIG. 7 is a flow chart of an example of an implementation of a process for creation of a free form user-designed single-handed touchscreen keyboard according to an embodiment of the present subject matter.
Figure 8A:
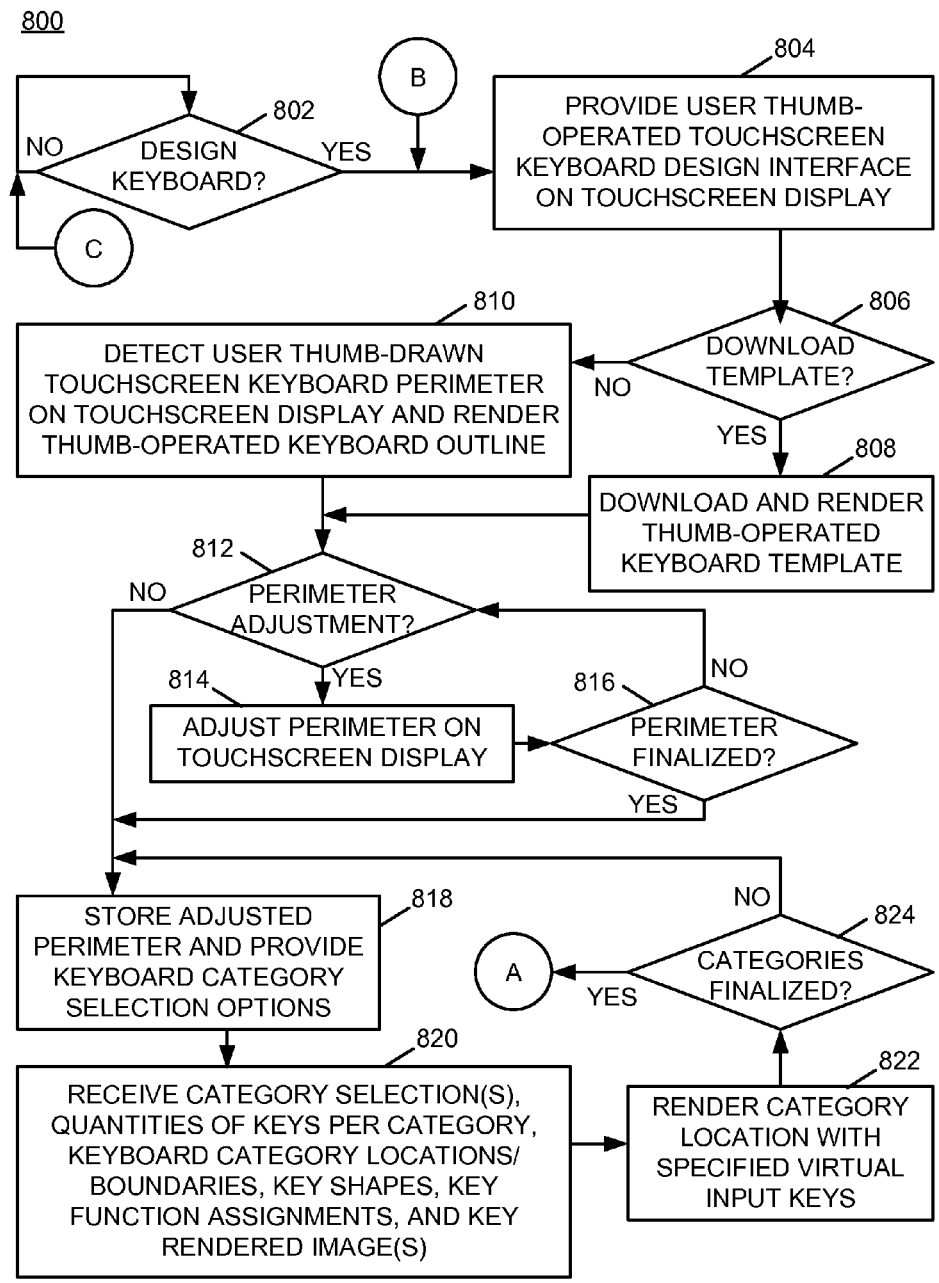
FIG. 8A is a flow chart of an example of an implementation of initial processing within a process for creation of a free form user-designed single-handed touchscreen keyboard that includes more detailed processing and an option to utilize a downloadable user-modifiable thumb-operated touchscreen keyboard template according to an embodiment of the present subject matter.
Figure 8B:
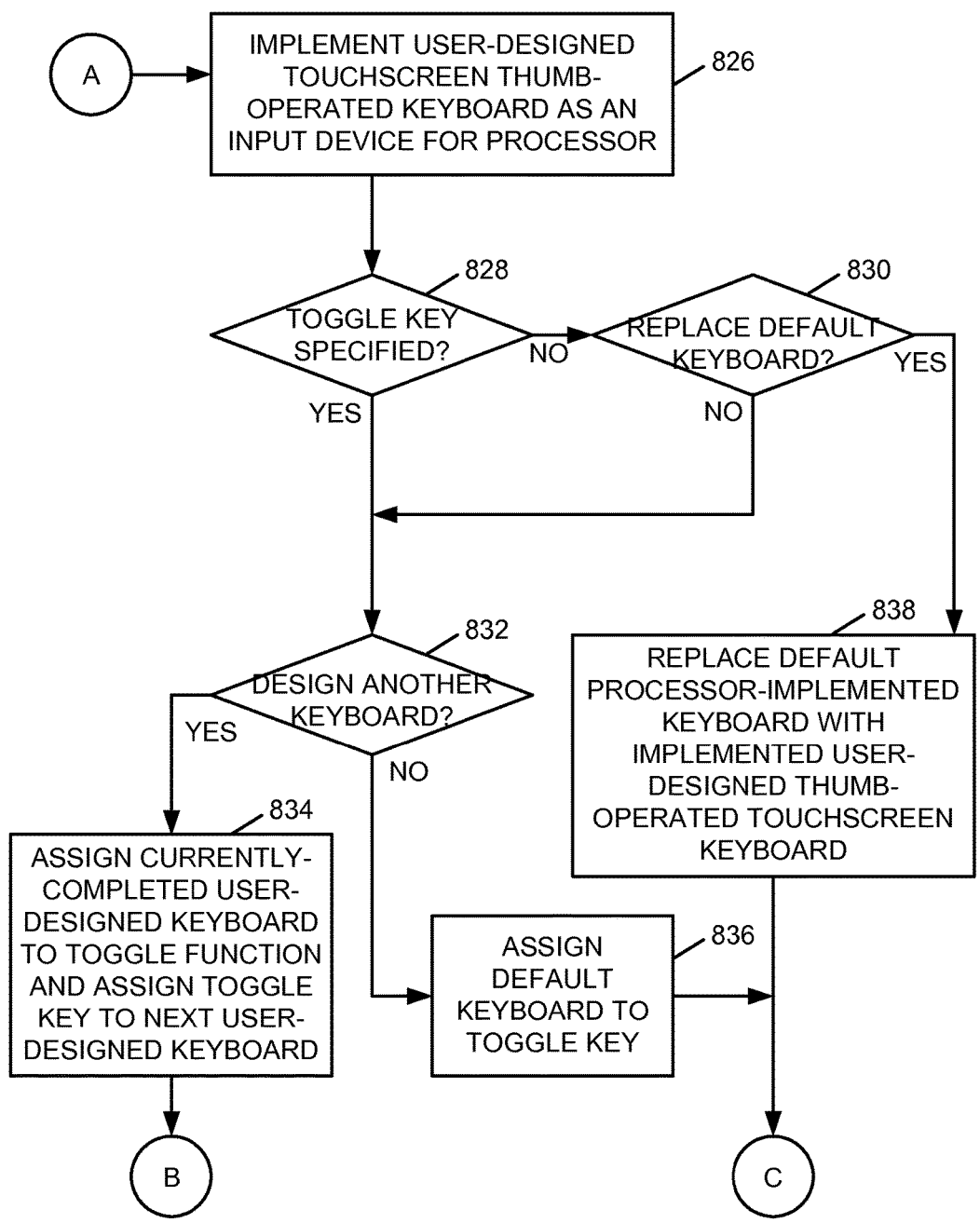
FIG. 8B is a flow chart of an example of an implementation of additional processing within a process for creation of a free form user-designed single-handed touchscreen keyboard that includes more detailed processing and an option to utilize a downloadable user-modifiable thumb-operated touchscreen keyboard template according to an embodiment of the present subject matter.

FIG. 7 through FIG. 8B described below represent example processes that may be executed by devices, such as the core processing module 100, to provide the free form user-designed single-handed touchscreen keyboard associated with the present subject matter. Many other variations on the example processes are possible and all are considered within the scope of the present subject matter. The example processes may be performed by modules, such as the user-designed touchscreen keyboard module 112 and/or executed by the CPU 102, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 7 is a flow chart of an example of an implementation of a process 700 for creation of a free form user-designed single-handed touchscreen keyboard. At block 702, the process 700 provides, by a processor on a touchscreen display of a handheld device, a user thumb-operated touchscreen keyboard design interface that allows a user to create a user-designed thumb-operated touchscreen keyboard. At block 704, the process 700 detects, via the user thumb-operated touchscreen keyboard design interface in response to user thumb gestures on the touchscreen display, a set of user inputs comprising: a user-specified outline on the touchscreen display of the user-designed thumb-operated touchscreen keyboard with boundaries within a range of motion of a thumb of the user on the touchscreen display, a plurality of different user-specified touchscreen input key locations and input key shapes of a plurality of user-specified touchscreen input keys within the user-specified outline of the user-designed thumb-operated touchscreen keyboard, and user-specified touchscreen input key processor-input function assignments of the plurality of user-specified touchscreen input keys. At block 706, the process 700 implements the user-designed thumb-operated touchscreen keyboard as a touchscreen display user input interface to the processor.

FIGS. 8A-8B illustrate a flow chart of an example of an implementation of process 800 for creation of a free form user-designed single-handed touchscreen keyboard that includes more detailed processing and an option to utilize a downloadable user-modifiable thumb-operated touchscreen keyboard template. FIG. 8A illustrates initial processing within the process 800. At decision point 802, the process 800 makes a determination as to whether a request from a user to design a user-designed thumb-operated touchscreen keyboard, such as a configured thumb gesture on a touchscreen display or an icon selection associated with a user thumb-operated touchscreen keyboard design interface, has been detected. In response to determining that a request from a user to design a user-designed thumb-operated touchscreen keyboard has been detected, the process 800 provides the user thumb-operated touchscreen keyboard design interface on a touchscreen display at block 804. The user thumb-operated touchscreen keyboard design interface allows a user to create the user-designed thumb-operated touchscreen keyboard. A dialog box for initial user design options may be presented, or the user thumb-operated touchscreen keyboard design interface may be configured with thumb gestures for certain keyboard design options. The user may be prompted to select keyboard design options in any manner appropriate for a given implementation.

As described above, the free form virtual touchscreen keyboard is designed to be used by the user with a single user hand and thumb actuation of all actions, including further design and use of the free form user-designed single-handed touchscreen keyboard. As such, the user may design and utilize a personalized thumb-drawn and thumb-operable touchscreen display keyboard. Additionally, the user may use "thumb drawing" on the surface of the touchscreen display to drag the user's thumb around a desired perimeter of the user-designed touchscreen keyboard or to adjust a pre-configured downloadable user-modifiable thumb-operated touchscreen keyboard template to the user's desired shape.

At decision point 806, the process 800 makes a determination as to whether a user-specification of an option, again by a configured thumb gesture or other appropriate selection (e.g., dialog box option), to download a user-modifiable thumb-operated touchscreen keyboard template has been detected. The user-modifiable thumb-operated touchscreen keyboard template may, for example, include a shape of a quarter-circle as described above in association with FIG. 3. In response to determining that a user-specification of an option to download a user-modifiable thumb-operated touchscreen keyboard template has been detected, the process 800 downloads and renders/displays the user-modifiable thumb-operated touchscreen keyboard template on the touchscreen display at block 808. In response to determining that a user-specification of an option to download a user-modifiable thumb-operated touchscreen keyboard template has not been detected, the process 800 performs processing to detect and render a user thumb-drawn perimeter of the user-designed thumb-operated touchscreen keyboard on the touchscreen display at block 810. Interpolation of lines and points may be used to enclose a partially enclosed user thumb-drawn shape of an outline of the user-designed thumb-operated touchscreen keyboard.

In response to either downloading and rendering the user-modifiable thumb-operated touchscreen keyboard template at block 808, or in response to detecting and rendering a user thumb-drawn perimeter of the user-designed thumb-operated touchscreen keyboard on the touchscreen display at block 810, the process 800 begins iterative processing for any user adjustments to the user thumb-drawn perimeter of the user-designed thumb-operated touchscreen keyboard or the downloaded user-modifiable thumb-operated touchscreen keyboard template. At decision point 812, the process 800 makes a determination as to whether any perimeter adjustments have been detected in relation to the rendered thumb-drawn perimeter or the rendered template. For example, the process 800 may detect one or more user thumb-push operations on the touchscreen display that cross a boundary along a perimeter of the thumb-drawn perimeter or the user-modifiable thumb-operated touchscreen keyboard template.

In response to determining a perimeter adjustment has been detected, the process 800 adjusts the respective rendered perimeter on the touchscreen display at block 814. The process 800 may, for example, adjust the displayed shape of the respective rendered perimeter in a direction of the detected boundary-crossing thumb-push operation to alter the rendered shape. It should be noted that the user may revert any adjustments and iterate as often as desired to finalize the shape of the perimeter of the user-designed thumb-operated touchscreen keyboard.

At decision point 816, the process 800 makes a determination as to whether a user input, again such as a configured touchscreen thumb gesture, indicating that the perimeter has been finalized has been detected. In response to determining that a user input user input indicating that the perimeter has been finalized has not been detected, the process 800 returns to decision point 812 and iterates as described above. As such, the process 800 adjusts, in response to each detected boundary-crossing thumb-push operation, the displayed shape of the respective rendered perimeter in a direction of each detected boundary-crossing thumb-push operation until the perimeter is finalized.

In response to determining at decision point 812 that no further perimeter adjustments have been detected (e.g., in a reasonable amount of time) in relation to the respective rendered perimeter, or in response to determining at decision point 816 that the user has indicated that the perimeter has been finalized, the process 800 stores the adjusted rendered shape of the respective perimeter as a finalized shape of the user-designed thumb-operated touchscreen keyboard within a memory, and provides keyboard category selection options to the user at block 818. The keyboard category selection options may be presented to the user, for example, in response to detection of a user specifying by thumb drawing a key category location to begin key assignments, in response to which the user may be provided with a category selection dialog box that includes the configured categories as described above.

As described above, this may also include iterative processing where the user may be presented with one or more pop-up dialog boxes for navigation to available input data element types for the respective category that is assigned to a given area of the keyboard. The categories of virtual input keys may include, among other things, an alphabetical/numerical/attribute category, a word category, a phrase/sentence category, an equation category, a keyboard control category, and other categories as appropriate for a given implementation. It should also be noted as described above that the user may assign multiple words or phrases to a single virtual key.

At block 820, the process 800 receives, on each iteration, a category selection, quantities of keys per category, keyboard category locations/boundaries, key shapes, key input function assignments, and key rendered images sufficient to specify the user-designed thumb-operated touchscreen keyboard for implementation as a touchscreen display user input interface to the processor. Again, this processing may be iterative to obtain the information sufficient to specify the user-designed thumb-operated touchscreen keyboard for implementation as a touchscreen display user input interface to the processor.

Additionally, as described above, this processing may include assigning a user-specified image as a rendered image of the user-specified touchscreen input key. Different images may be assigned to different keys to allow visual distinction of different keys and/or categories. As also described above, a detected selection of user contact with the user-specified touchscreen input key with the rendered image may cause display of a pop-up dialog box that comprises the set of configured user-specified selectable text phrases rendered for selection, and a detected termination of the user contact over one of the rendered set of user-specified selectable text phrases may select the respective rendered one of the set of user-specified selectable text phrases as input to the processor. In this manner, use of a single input key may be efficiently assigned to entry of multiple entire phrases to further improve efficiency of the user-designed thumb-operated touchscreen keyboard.

At block 822, the process 800 renders the category location with the specified virtual/touchscreen input keys. At decision point 824, the process 800 makes a determination as to whether the user has indicated, again for example by a configured touchscreen thumb gesture, that all categories for the user-designed thumb-operated touchscreen keyboard have been specified. In response to determining that the user has not indicated that all categories for the user-designed thumb-operated touchscreen keyboard have been specified, the process 800 returns to block 818 and iterates as described above to obtain specifications for additional keyboard category and virtual input key selection options. In response to determining at decision point 824 that the user has indicated that all categories for the user-designed thumb-operated touchscreen keyboard have been specified, the process 800 transitions to the processing shown and described in association with FIG. 8B.

FIG. 8B illustrates additional processing associated with the process 800 for creation of a free form user-designed single-handed touchscreen keyboard that includes more detailed processing and an option to utilize a downloadable user-modifiable thumb-operated touchscreen keyboard template. At block 826, the process 800 implements the user-designed thumb-operated touchscreen keyboard as a touchscreen display user input interface to the processor.

At decision point 828, the process 800 makes a determination as to whether a toggle key has been specified by the user. As described above, the user may configure a toggle key to toggle to an alternative (e.g., default or other user-designed) keyboard. In response to determining that a toggle key has not been specified by the user, the process 800 makes a determination at decision point 830 as to whether the user has indicated to replace a default processor-implemented touchscreen keyboard (e.g., a QUERTY touchscreen keyboard) with the implemented user-designed thumb-operated touchscreen keyboard.

In response to determining at decision point 830 that the user has not indicated to replace a default processor-implemented touchscreen keyboard with the implemented user-designed thumb-operated touchscreen keyboard, or in response to determining at decision point 828 that a toggle key has been specified by the user, the process 800 makes a determination at decision point 832 as to whether a user request to design another (e.g., second or subsequent) user-designed thumb-operated touchscreen keyboard has been detected. In response to determining that a user request to design another user-designed thumb-operated touchscreen keyboard has been detected, the process 800 assigns the currently-completed user-designed keyboard to the toggle function of the toggle key and assigns the toggle key to the next user-designed thumb-operated touchscreen keyboard at block 834. In this manner, for multiple user-designed keyboards, the user-designed thumb-operated touchscreen keyboards may be iteratively accessed using the toggle key assigned to each keyboard. While the user may alter the location of the toggle key on the different user-designed thumb-operated touchscreen keyboards, there may be an economy of motion and use by leaving the toggle key in the same location on each user-designed thumb-operated touchscreen keyboard.

The process 800 returns to FIG. 8A at block 804 to allow the user to design another user-designed thumb-operated touchscreen keyboard and iterates as described above. A detected selection of any user-specified keyboard toggle input key of the one or multiple user-designed thumb-operated touchscreen keyboard(s) may toggle to another user-designed thumb-operated touchscreen keyboard, and a detected selection of a user-specified keyboard toggle input key of the other user-designed thumb-operated touchscreen keyboard may toggle to one or more other user-designed thumb-operated touchscreen keyboard (e.g., back to the first user-designed thumb-operated touchscreen keyboard or to a default processor-implemented keyboard for a two-keyboard implementation).

Returning to the description of decision point 832, in response to determining that a user request to design another user-designed thumb-operated touchscreen keyboard has not been detected (e.g., that keyboard design is completed), the process 800 assigns the default processor-implemented default touchscreen keyboard at block 836. As such, the processor-implemented default touchscreen keyboard may be used in conjunction with one or more user-designed thumb-operated touchscreen keyboards. In this way, the present technology may integrate one or more user-designed thumb-operated touchscreen keyboards as a selectable touchscreen keyboard of a processor with a keyboard toggle operation that toggles between the user-designed thumb-operated touchscreen keyboard(s) and a processor-implemented default touchscreen keyboard.

Returning to the description of decision point 830, in response to determining to replace the default processor-implemented touchscreen keyboard with any user-designed thumb-operated touchscreen keyboard, the process 800 replaces the default processor-implemented touchscreen keyboard with the respective user-designed thumb-operated touchscreen keyboard at block 838. In response to replacing the default processor-implemented touchscreen keyboard with the respective user-designed thumb-operated touchscreen keyboard at block 838, or in response to assigning the default processor-implemented touchscreen keyboard to the toggle key at block 836, the process 800 returns to FIG. 8A at decision point 802 and iterates as described above.

As such, the process 800 allows a user to specify multiple user-designed thumb-operated touchscreen keyboards and integrate each user-designed thumb-operated touchscreen keyboard as a touchscreen display user input interface to a processor. The user-designed thumb-operated touchscreen keyboard(s) may replace a default processor-implemented default touchscreen keyboard, or the user-designed thumb-operated touchscreen keyboard(s) may coexist and be individually selectable by implementation of a toggle key that iteratively selects the respective different touchscreen keyboards.

As described above in association with FIG. 1 through FIG. 8B, the example systems and processes provide a free form user-designed single-handed touchscreen keyboard. Many other variations and additional activities associated with a free form user-designed single-handed touchscreen keyboard are possible and all are considered within the scope of the present subject matter.

Those skilled in the art will recognize, upon consideration of the above teachings, that certain of the above examples are based upon use of a programmed processor, such as the CPU 102. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
by a processor of a handheld device:
detecting a set of user keyboard design inputs entered via a user thumb-operated touchscreen keyboard design interface in response to user thumb gestures on a touchscreen display of the handheld device, the set of user keyboard design inputs comprising: (i) a combined two-dimensional (2D) keyboard boundary and 2D range of motion input data set comprising at least two user thumb drawn edges and one user thumb drawn arc, each drawn at lengths and locations that input corresponding 2D range of motion limits of a thumb of a user and each inter-connectable within a boundary of the touchscreen display to form an enclosed perimeter of a user-designed thumb-operated touchscreen keyboard within the 2D range of motion limits of the thumb of the user across a 2D plane of the touchscreen display, where use of the 2D range of motion limits of the thumb of the user as part of a user's personal keyboard design process ergonomically tailors the user-designed thumb-operated touchscreen keyboard to the user's specific hand characteristics and prevents the 2D range of motion limits of the thumb of the user from inhibiting use of the user-designed thumb-operated touchscreen keyboard by the user, (ii) a plurality of different user thumb contacts within the enclosed perimeter that specify user-assigned touchscreen input key locations of a respective plurality of user-specified touchscreen input keys, (iii) a plurality of user thumb contacts that specify user-assigned input key shapes of each of the plurality of user-specified touchscreen input keys, and (iv) a plurality of user-specified touchscreen input key processor-input function assignments that specify processor inputs provided by each of the plurality of user-specified touchscreen input keys, where at least one user-specified touchscreen input key is assigned by the user to provide a plurality of selectable multi-word text message phrases as the specified processor inputs;

implementing the user-designed thumb-operated touchscreen keyboard as a touchscreen display user input interface to the processor; and controlling input to the processor via the user-specified touchscreen input key processor function assignments responsive to user selections of the user-specified touchscreen input keys on the user-designed thumb-operated touchscreen keyboard.

2. The method of claim 1, where detecting (i) the combined 2D keyboard boundary and 2D range of motion input data set comprising the at least two user thumb drawn edges and the one user thumb drawn arc comprises:

detecting, as drawn around the enclosed perimeter by the thumb of the user, a location of multiple line sections that identify an extent of each boundary of the enclosed perimeter of the user-designed thumb-operated touchscreen keyboard on the touchscreen display, where the extent of each boundary results from the 2D range of motion limits of the thumb of the user on the touchscreen display in a direction represented by the respective boundary, and where the multiple line sections are interpolated to form the enclosed perimeter of the user-designed thumb-operated touchscreen keyboard.

3. The method of claim 1, further comprising:

downloading a user-modifiable thumb-operated touchscreen keyboard template that, when displayed, comprises a perimeter outline with a shape of a quarter-circle;

displaying the perimeter outline of the downloaded user-modifiable thumb-operated touchscreen keyboard template on the touchscreen display; and where detecting (i) the combined 2D keyboard boundary and 2D range of motion input data set comprising the at least two user thumb drawn edges and the one user thumb drawn arc comprises:

detecting a plurality of user thumb-push operations on the touchscreen display that cross a boundary along the displayed perimeter outline of the user-modifiable thumb-operated touchscreen keyboard template and that adjust the user-modifiable thumb-operated touchscreen keyboard template to the 2D range of motion limits of the thumb of the user;

adjusting, in response to each detected boundary-crossing thumb-push operation, the displayed shape of the displayed perimeter outline of the downloaded user-modifiable thumb-operated touchscreen keyboard template in a direction of each detected boundary-crossing thumb-push operation to ergonomically tailor the modifiable thumb-operated touchscreen keyboard template to the 2D range of motion limits of the thumb of the user; and storing, in response to detection of a finalizing input, the adjusted displayed shape of the displayed perimeter outline of the downloaded user-modifiable thumb-operated touchscreen keyboard template as a finalized shape of the user-designed thumb-operated touchscreen keyboard within a memory.

4. The method of claim 1, further comprising:

providing a plurality of keyboard category specification options to the user comprising a word category option, a sentence/phrase category option, a letter and attribute category option, and a keyboard control category option; and where detecting (ii) the plurality of different user thumb contacts within the enclosed perimeter that specify the user-assigned touchscreen input key locations of the respective plurality of user-specified touchscreen input keys, (iii) the plurality of user thumb contacts that specify the user-assigned input key shapes of each of the plurality of user-specified touchscreen input keys, and (iv) the plurality of user-specified touchscreen input key processor-input function assignments that specify the processor inputs provided by each of the plurality of user-specified touchscreen input keys comprises:

detecting user selections of:
a plurality of category options from the plurality of keyboard category specification options;
a quantity of keys per selected category option;
keyboard category boundaries within the enclosed perimeter of the user-designed thumb-operated touchscreen keyboard of each selected category option;
the input key shapes of each of the plurality of user-specified touchscreen input keys; and
the user-specified touchscreen input key processor-input function assignments that specify the processor inputs provided by each of the plurality of user-specified touchscreen input keys.

5. The method of claim 1, further comprising:

detecting, via the user thumb-operated touchscreen keyboard design interface in response to additional user thumb gestures on the touchscreen display of the handheld device, assignment of a user-specified image to a user-specified touchscreen input key that comprises the plurality of selectable multi-word text message phrases; and assigning the user-specified image as a rendered image of the user-specified touchscreen input key;

where a detected selection of a user contact with the user-specified touchscreen input key with the rendered image causes display of a pop-up dialog box that comprises the plurality of selectable multi-word text message phrases rendered for selection, and a detected termination of the user contact over one of the rendered plurality of selectable multi-word text message phrases selects the one of the rendered plurality of selectable multi-word text message phrases as input to the processor.

6. The method of claim 1, where implementing the user-designed thumb-operated touchscreen keyboard as the touchscreen display user input interface to the processor comprises:

integrating the user-designed thumb-operated touchscreen keyboard as a selectable touchscreen keyboard of the processor with a keyboard toggle operation that toggles between the user-designed thumb-operated touchscreen keyboard and a processor-implemented default touchscreen keyboard.

7. The method of claim 1, where the user-designed thumb-operated touchscreen keyboard comprises a first user-designed thumb-operated touchscreen keyboard and further comprising:
  detecting, via the user thumb-operated touchscreen keyboard design interface in response to user thumb gestures on the touchscreen display, a first user-specified keyboard toggle input key and an additional set of user keyboard design inputs that specify a second user-designed thumb-operated touchscreen keyboard that comprises a second user-specified keyboard toggle input key; and
  implementing, via the first user-specified keyboard toggle input key and the second user-specified keyboard toggle input key, the second user-designed thumb-operated touchscreen keyboard as a second touchscreen display user input interface to the processor;
  where a detected selection of the first user-specified keyboard toggle input key of the first user-designed thumb-operated touchscreen keyboard toggles to the second user-designed thumb-operated touchscreen keyboard, and a detected selection of the second user-specified keyboard toggle input key of the second user-designed thumb-operated touchscreen keyboard toggles to the first user-designed thumb-operated touchscreen keyboard.

8. The method of claim 1, where detecting (i) the combined 2D keyboard boundary and 2D range of motion input data set comprising the at least two user thumb drawn edges and the one user thumb drawn arc comprises:
  detecting the thumb of the user contacting a surface of the touchscreen display at an origin and then drawing the at least two user thumb drawn edges and the one user thumb drawn arc as one fluid motion of the thumb of the user along the surface of the touchscreen display from the origin and returning to the origin, with a resulting continuous shape forming the enclosed perimeter of the user-designed thumb-operated touchscreen keyboard that is ergonomically tailored to the user's specific hand characteristics.

\* \* \* \* \*